(12) United States Patent
Park et al.

(10) Patent No.: US 8,229,013 B2
(45) Date of Patent: Jul. 24, 2012

(54) METHODS AND SYSTEMS FOR MAXIMUM-LIKELIHOOD DETECTION USING POST-SQUARING COMPENSATION

(75) Inventors: Jong Hyeon Park, San Jose, CA (US); Allert van Zelst, Woerden (NL); Brian Clarke Banister, San Diego, CA (US); Je Woo Kim, Cupertino, CA (US); Matthias Brehler, Boulder, CO (US); Vincent K. Jones, IV, Redwood City, CA (US)

(73) Assignee: Qualcomm Incorporated, San Diego, CA (US)

( * ) Notice: Subject to any disclaimer, the term of this patent is extended or adjusted under 35 U.S.C. 154(b) by 845 days.

(21) Appl. No.: 12/211,928

(22) Filed: Sep. 17, 2008

(65) Prior Publication Data

US 2010/0067597 A1 Mar. 18, 2010

(51) Int. Cl.
*H04L 5/12* (2006.01)
*H03D 1/00* (2006.01)
(52) U.S. Cl. ........................ 375/262; 375/341
(58) Field of Classification Search .................. 375/262, 375/341
See application file for complete search history.

(56) References Cited

U.S. PATENT DOCUMENTS

| 7,720,169 B2 * | 5/2010 | Reuven et al. ............... 375/267 |
| 2005/0265465 A1 * | 12/2005 | Hosur et al. ................ 375/260 |
| 2006/0018410 A1 * | 1/2006 | Onggosanusi et al. ....... 375/340 |
| 2007/0077969 A1 * | 4/2007 | Lauer et al. ................. 455/562.1 |
| 2008/0152027 A1 * | 6/2008 | Kalluri et al. ................. 375/260 |
| 2008/0273632 A1 * | 11/2008 | Farhang-Boroujeny et al. ............................ 375/341 |
| 2009/0316840 A1 * | 12/2009 | Park et al. .................... 375/341 |

FOREIGN PATENT DOCUMENTS

| WO | WO2008027554 | * | 8/2007 |
| WO | WO2008027554 A2 | | 3/2008 |

OTHER PUBLICATIONS

Alessandro Tomasoni et al: "Turbo-Lord: MAP-Approaching Soft-Input Soft-Output Detector for Iterative MIMO Receivers" Global Telecommunications Conference, 2007. Globecom '07. IEEE, IEEE, Piscataway, NJ, USA, Nov. 1, 2007, pp. 3504-3508, XP031196593 ISBN: 978-1-4244-1042-2.
International Search Report and Written Opinion—PCT/US2009/056759, International Search Authority—European Patent Office—Jul. 23, 2010.

* cited by examiner

*Primary Examiner* — David C. Payne
*Assistant Examiner* — Sarah Hassan
(74) *Attorney, Agent, or Firm* — Tyler Overall

(57) ABSTRACT

A "post-squaring" detection algorithm, and related devices, that may reduce the complexity of maximum likelihood detection (MLD) schemes while preserving their performance is provided. Rather than search for optimum metrics (such as minimum distance metrics) based on squared norm values, a search may be based on un-squared norm metrics, and the squaring may be postponed, for example, until subsequent log-likelihood ratio (LLR) computation. For certain embodiments, approximations of un-squared norm values may significantly reduce computation complexity.

16 Claims, 15 Drawing Sheets

| Operation | Max-Log-Map MLD | PC-MLD | QRMLD | PC-QRMLD |
|---|---|---|---|---|
| Metric calculation | 4 x 4096 RM<br>3 x 4096 RA | 9 x 4096 RA<br>3 x 4096 RC<br>3 x 4096 RS | 4 x 128 RM<br>3 x 128 RA | 9 x 128 RA<br>3 x 128 RC<br>3 x 128 RS |
| Minima search | 12 x 4096 RC | 12 x 4096 RC | 12 x 64 RC | 12 x 64 RC |
| Post squared norm | 0 | 2 x 12 RM | 0 | 2 x 12 RM |
| Bit LLR calculation | 12 RA | 12 RA | 12 RA | 12 RA |
| Comments | RM(real multiplication), RA(real addition), RC(real comparator), RS(real selector),<br>Assumed 1 real ABS = 1 RA | | | |

FIG. 11

| ML scheme | Metric in metric calculation | Post-squaring? | Equivalent metric for bit LLR | ML scheme |
|---|---|---|---|---|
| QRMLD | $l_2$norm | No | $l_2$norm | L2 reference |
| PC-QRMLD | $l_2$norm | Yes | squared $l_2$norm | Equivalent to QRMLD |
| QRMLD | squared $l_2$norm | No | squared $l_2$norm | ML(Squared L2) reference |

| Coding (Burst Rate, Block size) | | QRMLD $l_2$ | PC-QRMLD $l_2$ | QRMLD squared $l_2$ |
|---|---|---|---|---|
| TBCC | R=1/2,B=36 | 0.22 | 0.00 | 0 |
| | R=1/2,B=36 | 0.32 | 0.00 | 0 |
| | R=1/2,B=36 | 0.30 | 0.00 | 0 |
| | R=1/2,B=36 | 0.20 | 0.00 | 0 |
| | R=2/3,B=48 | 0.15 | 0.00 | 0 |
| | R=3/4,B=54 | 0.26 | 0.00 | 0 |
| CTC | R=1/2,B=36 | 2.06 | 0.00 | 0 |
| | R=1/2,B=36 | 2.03 | 0.00 | 0 |
| | R=1/2,B=36 | 2.12 | 0.00 | 0 |
| | R=1/2,B=36 | 2.15 | 0.00 | 0 |
| | R=1/2,B=108 | 2.15 | 0.00 | 0 |
| | R=2/3,B=48 | 2.18 | 0.00 | 0 |
| | R=3/4,B=54 | 2.41 | 0.00 | 0 |
| | R=5/6,B=60 | 2.28 | 0.00 | 0 |

METHODS AND SYSTEMS FOR MAXIMUM-LIKELIHOOD DETECTION USING POST-SQUARING COMPENSATION

TECHNICAL FIELD

The present disclosure generally relates to MIMO OFDM communication systems and more specifically to a method to reduce computational complexity of Max-Log-MAP based maximum-likelihood (ML) detection applied at the receiver.

BACKGROUND

A multiple-input multiple-output (MIMO) communication system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, with $N_S \leq \min\{N_T, N_R\}$. Each of the $N_S$ independent channels is also referred to as a spatial sub-channel of the MIMO channel and corresponds to a dimension. The MIMO system can provide improved performance (e.g., increased transmission capacity) over that of a single-input single-output (SISO) communication system if the additional dimensionalities created by the multiple transmit and receive antennas are utilized.

A wideband MIMO system typically experiences frequency selective fading, i.e. different amounts of attenuation across the system bandwidth. This frequency selective fading causes inter-symbol interference (ISI), which is a phenomenon whereby each symbol in a received signal acts as distortion to subsequent symbols in the received signal. This distortion degrades performance by impacting the ability to correctly detect the received symbols. As such, ISI is a non-negligible noise component that may have a large impact on the overall signal-to-noise-and-interference ratio (SNR) for systems designed to operate at high SNR levels, such as MIMO systems. In such systems, equalization may be used at the receivers to combat ISI. However, the computational complexity required to perform equalization is typically significant or prohibitive for most applications.

Orthogonal frequency division multiplexing (OFDM) may be used to combat ISI without the use of computationally intensive equalization. An OFDM system effectively partitions the system bandwidth into a number of ($N_F$) frequency sub-channels, which may be referred to as sub-bands or frequency bins. Each frequency sub-channel is associated with a respective subcarrier frequency upon which data may be modulated. The frequency sub-channels of the OFDM system may experience frequency selective fading (i.e., different amounts of attenuation for different frequency sub-channels) depending on the characteristics (e.g., multipath profile) of the propagation path between transmit and receive antennas. With OFDM, the ISI due to the frequency selective fading may be combated by repeating a portion of each OFDM symbol (i.e., appending a cyclic prefix to each OFDM symbol), as is known in the art. A MIMO system may thus advantageously employ OFDM to combat ISI.

In order to increase the transmission data rate and spectral efficiency of the system, spatial multiplexing may be applied at the transmitter where different and independent data streams may be communicated over a plurality of spatial sub-channels. The detection accuracy of the receiver can be severely degraded due to a strong multiple access interference (interference of data streams transmitted from different antennas). Moreover, spatial and frequency sub-channels may experience different channel conditions (e.g., fading and multipath effects) and may achieve different SNRs. Also, channel conditions may vary over time.

Different techniques can be applied at the receiver to accurately detect information data transmitted from a plurality of antennas over spatial and frequency sub-channels. Suppression of the multiple access interference in MIMO-OFDM system can be achieved by applying maximum likelihood (ML) detection at the receiver.

The ML detection is optimal algorithm in terms of accuracy because likelihoods of all symbol vectors that can be possibly transmitted from a plurality of antennas may be evaluated. On the other side, computational complexity may be large especially in systems with high spectral efficiency that employ large number of transmit antennas and high-order modulation types.

The Log-MAP (maximum a posteriori) ML detection can be considered as an ideal maximum-likelihood algorithm in terms of error rate performance. It utilizes squared $l_2$ norm as a metric for calculation of log-likelihood ratios (hereinafter abbreviated as LLRs) of coded transmission bits. Complexity of direct computation of squared $l_2$ norms may be large, especially for high order modulation types and/or high dimensional Multiple-Input Multiple-Output (MIMO) wireless systems. Due to a high computational complexity of the Log-MAP ML algorithm, the Max-Log-MAP approach for ML detection may be preferred for actual hardware implementation where summation operations can be replaced with comparison operations. But, this approach also requires computation of squared $l_2$ norms.

Therefore, there is a need in the art to reduce computational complexity of the Max-Log-MAP based ML detection in systems with high spectral efficiency.

SUMMARY

Certain embodiments of the present disclosure provide a method for detection of data transmitted on a plurality of spatial channels in a multiple-input multiple-output wireless communications system. The method generally includes calculating un-squared norm metrics for a set of hypothesized symbols that that correspond to coded bits transmitted over the spatial channels, searching the un-squared norm metrics for optimum metrics, squaring optimum metrics found during the searching to obtain post-squared metrics, and calculating log-likelihood ratio values for coded bits transmitted over the spatial channels using post-squared metrics.

Certain embodiments of the present disclosure provide an apparatus for detection of data transmitted on a plurality of spatial channels in a multiple-input multiple-output wireless communications system. The apparatus generally includes logic for calculating un-squared norm metrics for a set of hypothesized symbols that that correspond to coded bits transmitted over the spatial channels, logic for searching the un-squared norm metrics for optimum metrics, logic for squaring optimum metrics found during the searching to obtain post-squared metrics, and logic for calculating log-likelihood ratio values for coded bits transmitted over the spatial channels using post-squared metrics.

Certain embodiments of the present disclosure provide an apparatus for detection of data transmitted on a plurality of spatial channels in a multiple-input multiple-output wireless communications system. The apparatus generally includes means for calculating un-squared norm metrics for a set of hypothesized symbols that that correspond to coded bits transmitted over the spatial channels, means for searching the un-squared norm metrics for optimum metrics, means for squaring optimum metrics found during the searching to obtain post-squared metrics, and means for calculating log-likelihood ratio values for coded bits transmitted over the spatial channels using post-squared metrics.

Certain embodiments of the present disclosure provide a computer-program product for detection of data transmitted on a plurality of spatial channels in a multiple-input multiple-output wireless communications system, comprising a computer readable medium having instructions stored thereon, the instructions being executable by one or more processors. The instructions generally include instructions for calculating un-squared norm metrics for a set of hypothesized symbols that that correspond to coded bits transmitted over the spatial channels, instructions for searching the un-squared norm metrics for optimum metrics, instructions for squaring optimum metrics found during the searching to obtain post-squared metrics, and instructions for calculating log-likelihood ratio values for coded bits transmitted over the spatial channels using post-squared metrics.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIG. 11 shows a comparison of computational complexity for several ML detection schemes used in the simulations in accordance with certain embodiments of the present disclosure.

FIG. 12 shows a summary of ML detection schemes used in the simulations in accordance with certain embodiments of the present disclosure.

FIG. 13 shows a packet error rate performance loss in dB units of different ML algorithms relative to the QRML detection with metric based on squared $l_2$ norm.

DETAILED DESCRIPTION

Figure 1:
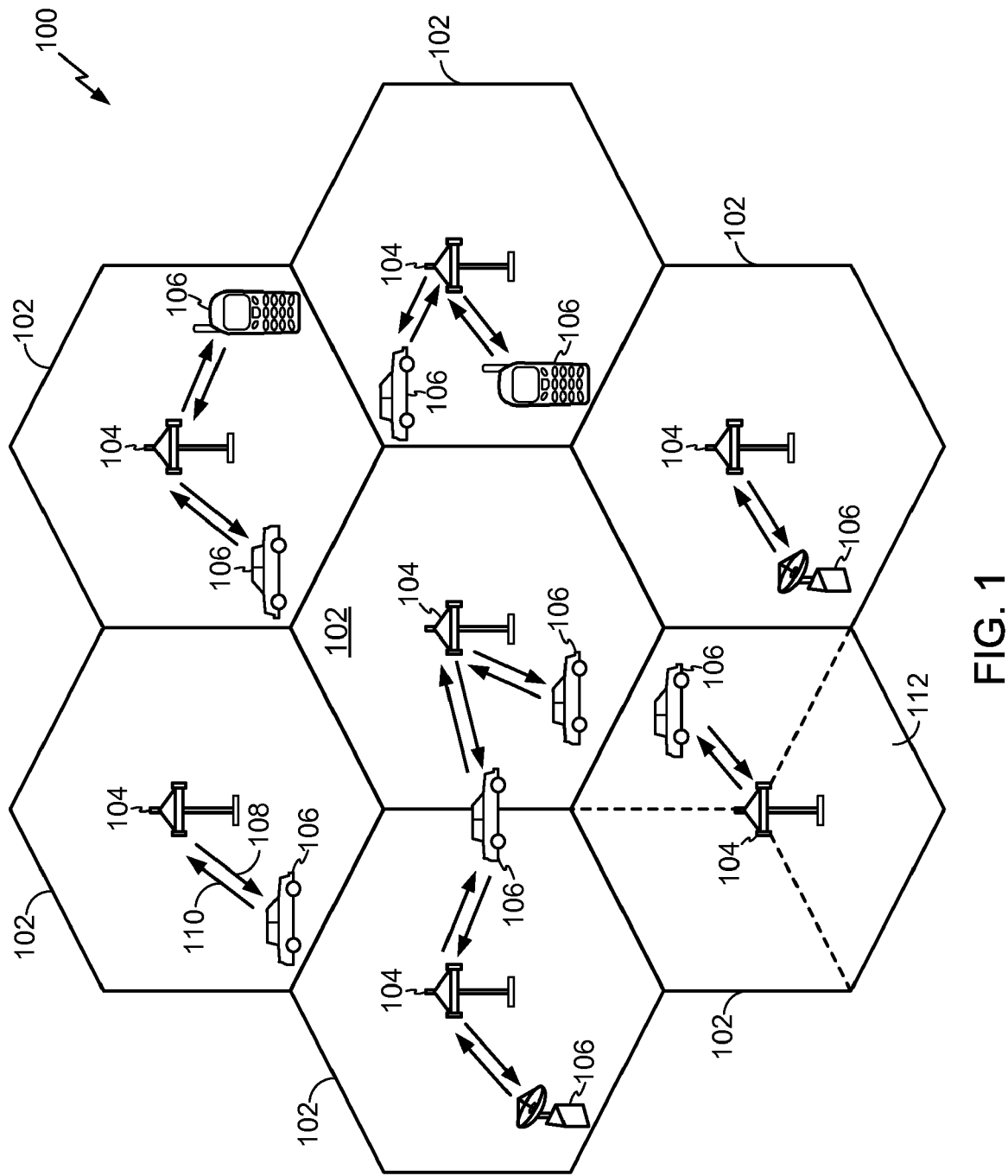
FIG. 1 illustrates an example wireless communication system, in accordance with certain embodiments of the present disclosure.

For certain embodiments of the present disclosure, a post squared compensation of un-squared $l_2$ norms is proposed as an alternative method for calculation of LLRs. Computational complexity of this scheme is significantly smaller than complexity of conventional Max-Log-MAP based ML algorithm, while the accuracy is preserved.

The proposed algorithm may be referred to as the post-squaring compensation maximum-likelihood detection (hereinafter abbreviated as PC-ML detection). Instead of direct calculation of squared $l_2$ norms employed in the conventional Max-Log-MAP based ML algorithm, non-squared $l_2$ norms may now be utilized. Squaring of $l_2$ norms may be postponed until the search for minima non-squared metrics is finished.

This approach may provide identical final result as a direct calculation of squared metrics performed before searching for minima values. Therefore, the PC-ML scheme achieves the same detection accuracy as the conventional Max-Log-MAP based ML algorithm. It can be shown that the computational complexity of the PC-ML detection algorithm is smaller than that of conventional Max-Log-MAP based ML detection since computation of non-squared $l_2$ norms can be accurately approximated with comparison and addition operations instead of multiplications that are utilized for direct computation of squared $l_2$ norms. Furthermore, because only minima metrics are post-squared, overhead in the computational complexity of the PC-ML algorithm introduced by the post-squaring compensation is small, and it does not affect the overall computational complexity.

The word "exemplary" is used herein to mean "serving as an example, instance, or illustration." Any embodiment described herein as "exemplary" is not necessarily to be construed as preferred or advantageous over other embodiments.
Exemplary Wireless Communication System The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
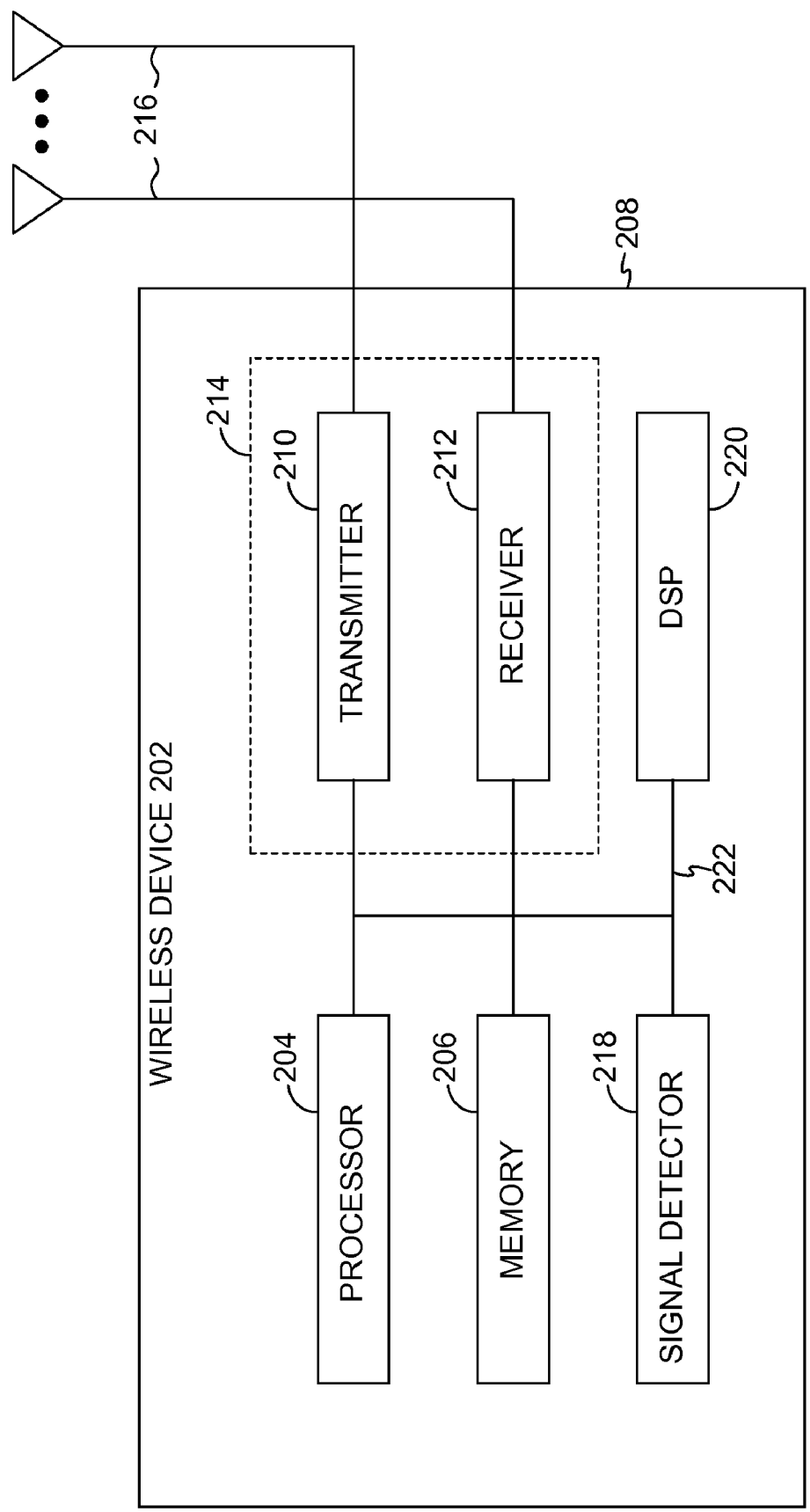
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. A plurality of transmit antennas 216 may be attached to the housing 208 and electrically coupled to the transceiver 214. The wireless device 202 may also include (not shown) multiple transmitters, multiple receivers, and multiple transceivers.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
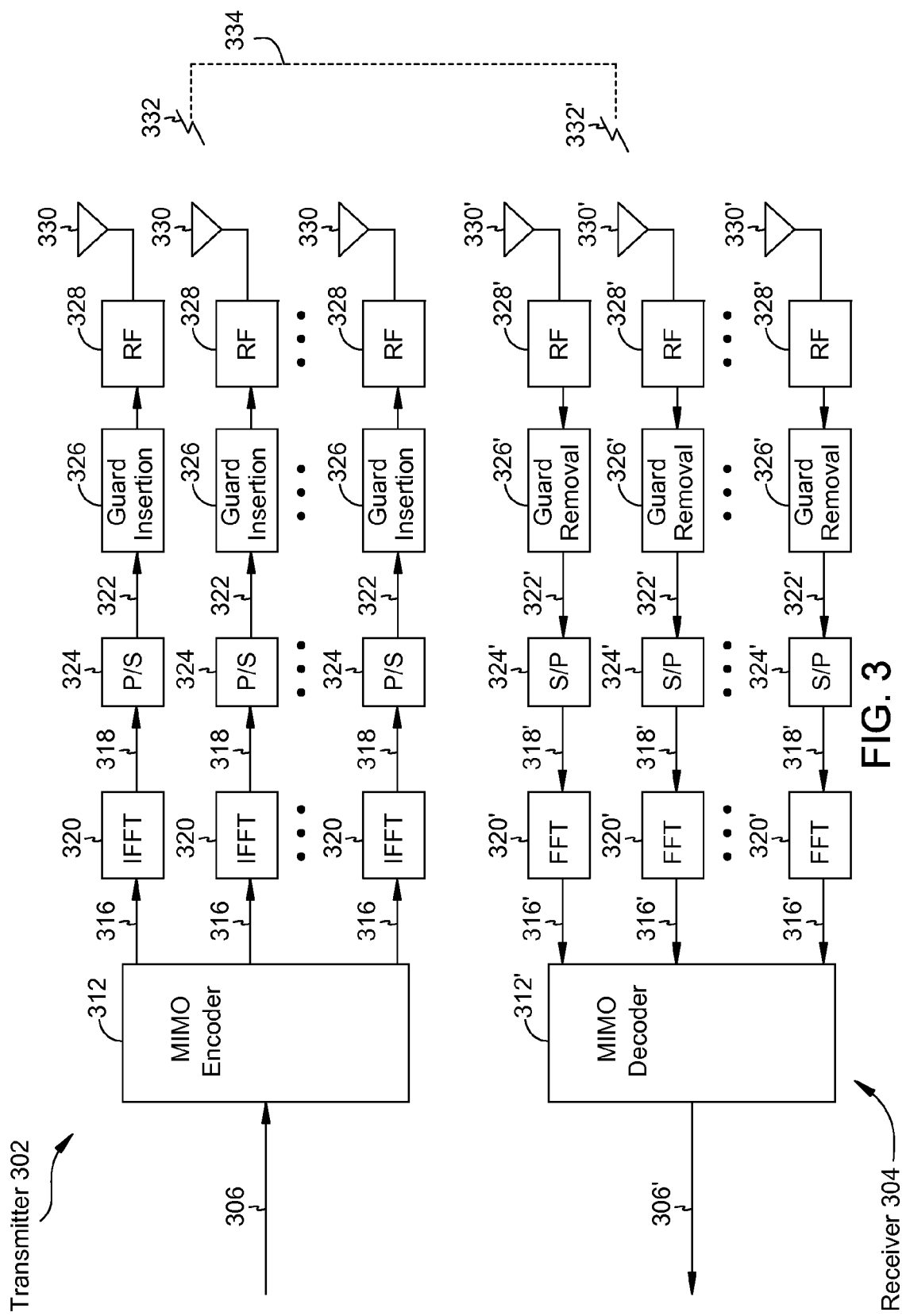
FIG. 3 illustrates an example transmitter and an example receiver that may be used within a wireless communication system in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to MIMO encoder 312. The MIMO encoder may encode the data 306 and map them onto M constellation points. The mapping may be done using some modulation constellation, such as binary phase-shift keying (BPSK), quadrature phase-shift keying (QPSK), 8 phase-shift keying (8PSK), quadrature amplitude modulation (QAM), etc, or null (zero valued) modulation if the sub-carrier is not assigned. Thus, the MIMO encoder 312 may output $N_{FFT}$ parallel symbol streams 316 per antenna path, each symbol stream 316 corresponding to $N_{FFT}$ orthogonal subcarriers of the inverse fast Fourier transforms (IFFTs) 320. These $N_{FFT}$ parallel symbol streams 316 are represented in the frequency domain and may be converted into $N_{FFT}$ parallel time domain sample streams 318 by IFFT components 320.

A brief note about terminology will now be provided. $N_T \times N_{FFT}$ parallel modulations in the frequency domain are equal to $N_T \times N_{FFT}$ modulation symbols in the frequency domain, which are equal to $N_T$ parallel $N_{FFT}$ mapping and $N_T$ parallel $N_{FFT}$-point IFFTs in the frequency domain, which is equal to $N_T$ (useful) OFDM symbols in the time domain, each of which is equal to $N_{FFT}$ samples in the time domain, where $N_T$ is the number of transmit antennas 330. After inserting Guard samples, one OFDM symbol in the time domain, $N_S$, is equal to $N_{CP}$ (the number of guard samples per OFDM symbol)+$N_{FFT}$ (the number of useful samples per OFDM symbol) samples.

For one of $N_T$ antenna path, the $N_{FFT}$ parallel time domain sample streams 318 may be converted into an OFDM/OFDMA symbol stream 322 by parallel-to-serial (P/S) converter 324. Guard insertion component 326 may insert guard interval between successive OFDM/OFDMA symbols in the OFDM/OFDMA symbol stream 322 generating $N_S=N_{CP}+N_{FFT}$ samples. The signal from the guard insertion component 326 may then be up-converted to a desired transmit frequency band by a radio frequency (RF) front end component 328, and the antenna array 330 may then transmit the resulting signal 332 across multiple spatial sub-channels 334.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a plurality of spatial sub-channels 334. When a signal 332' is received by the antenna array 330', the received signal 332' may be downconverted to a baseband signal by RF front end components 328'. Guard removal components 326' may then remove the guard intervals that were inserted between OFDM/OFDMA symbols by the guard insertion components 326.

For one of $N_T$ antenna path, the output of the guard removal component 326' may be provided to S/P converter 324'. The S/P converter 324' may divide the OFDM/OFDMA symbol stream 322' into the $N_{FFT}$ parallel time-domain symbol streams 318', each of which corresponds to one of the $N_{FFT}$ orthogonal subcarriers. Fast Fourier transform (FFT) component 320' may convert the $N_{FFT}$ parallel time-domain symbol streams 318' into the frequency domain and output $N_{FFT}$ parallel frequency-domain symbol streams 316'.

A MIMO decoder 312' may perform the inverse of the encoding and symbol mapping operations that were performed by the MIMO encoder 312 thereby outputting the same number of data stream 306' as the data 306. Ideally, this data stream 306' corresponds to the data 306 that was provided as input to the transmitter 302. Note that elements 312', 316', 320', 318' and 324' may all be found on a in a baseband processor 340'.

Exemplary MIMO-OFDM System Model

Figure 4:
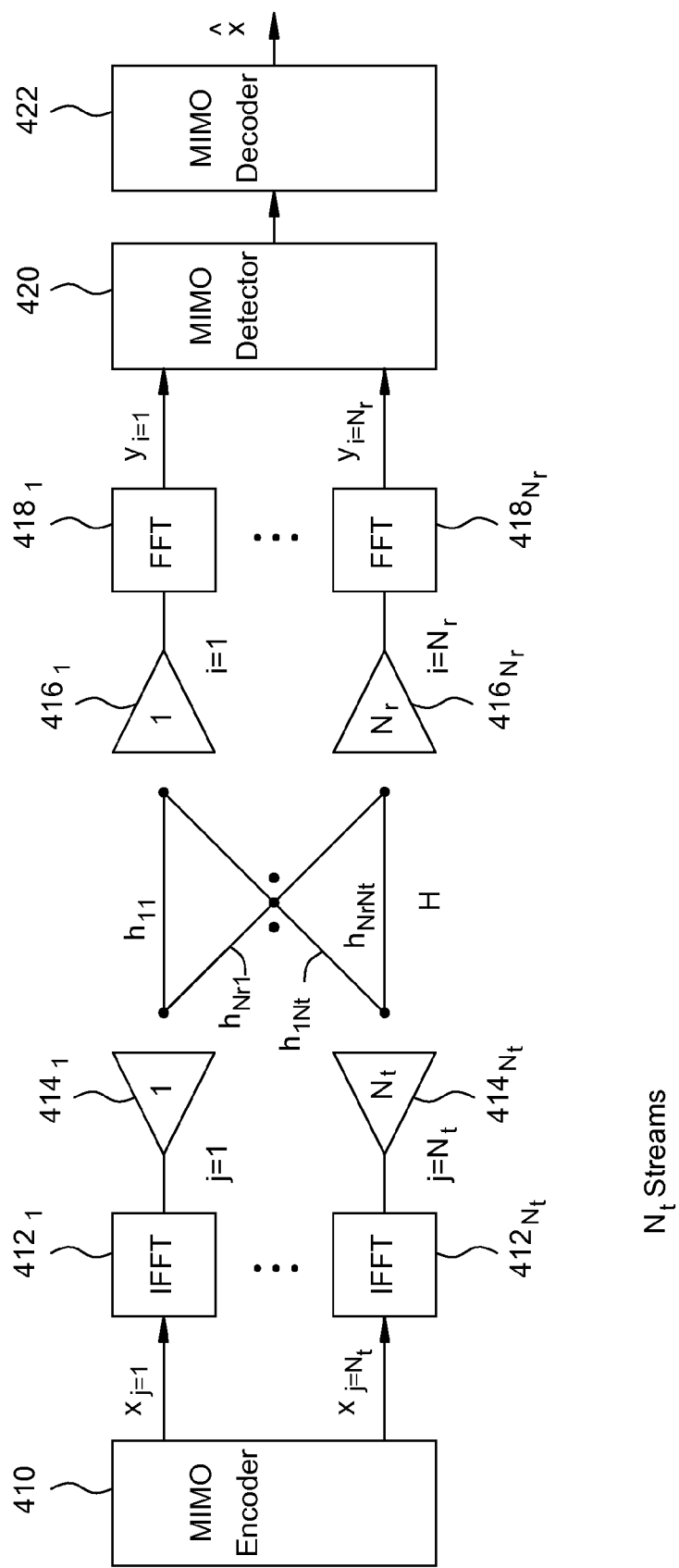
FIG. 4 illustrates a block diagram of a generic MIMO-OFDM wireless system in accordance with certain embodiments of the present disclosure.

FIG. 4 shows a block diagram of generic multiple-input multiple-output (MIMO) OFDM wireless communication system with $N_T$ transmit and $N_R$ receive antennas. The system model for the $k^{th}$ sub-carrier (frequency sub-channel) may be represented with linear equation:

$$y_k = H_k x_k + n_k, k=1, 2, \ldots, N_{FFT} \quad (1)$$

where $N_{FFT}$ is the number of orthogonal sub-carriers (frequency bins) in MIMO-OFDM system.

In equations and accompanying disclosure below, the sub-carrier index k is omitted for simplicity. Therefore, the system model can be re-written in the simple notation as:

$$y = Hx + n \quad (2)$$

$$y = [y_1 \ y_2 \ \ldots \ y_{N_r}]^T \quad (3)$$

$$H = [h_1 \ h_2 \ \ldots \ h_{N_t}] = \begin{bmatrix} h_{11} & h_{12} & \ldots & h_{1N_t} \\ & \ldots & & \\ h_{N_r1} & h_{N_r2} & \ldots & h_{N_rN_t} \end{bmatrix} \quad (4)$$

$$x = [x_1 \ x_2 \ \ldots \ x_{N_t}]^T \quad (5)$$

$$n = [n_1 \ n_2 \ \ldots \ n_{N_r}]^T \quad (6)$$

where y is $[N_r \times 1]$ received symbol vector, H is $[N_r \times N_t]$ channel matrix and $h_j$ is its $j^{th}$ column vector that contains channel gains between the transmit antenna j and all $N_r$ receive antennas, x is $[N_t \times 1]$ transmitted symbol vector, n is $[N_r \times 1]$ complex noise vector with covariance matrix $E(nn^H)$.

As illustrated in FIG. 4, the transmission signal may be first encoded by MIMO encoder 410. A redundancy may be included to protect the information data during the transmission over noisy wireless channels. An encoded signal may then be split into $N_t$ spatial data streams $x_1, x_2, \ldots, x_{Nt}$, as shown in FIG. 4. A plurality of spatial data streams can be converted into a time domain by utilizing Inverse Fast Fourier Transform (IFFT) units $412_1, \ldots, 412_{Nt}$. The signal may then be up converted to a desired transmission frequency band and transmitted from $N_t$ transmit antennas $414_1, \ldots, 414_{Nt}$ over $N_r \cdot N_t$ single-input single-output (SISO) channels.

$N_r$ receive antennas $416_1, \ldots, 416_{Nr}$ are employed at the receiver. Received data streams can be converted back into a frequency domain by using the Fast Fourier Transform (FFT) units $418_1, \ldots, 418_{Nr}$. A frequency domain signal may be input into a MIMO detector 420 that generates reliability messages for coded bits transmitted over a plurality of spatial sub-channels. A reliability message represents a probability that the particular transmitted coded bit is either bit "0" or bit "1". This information can be passed to the outer MIMO channel decoder 422, and the estimated information data $\hat{x}$ for a plurality of spatial sub-channels (transmit antennas) are available after removing the redundancy included at the transmitter.

For a given vector v, $l_p$ norm can be defined as:

$$v = [v_1 \ v_2 \ \ldots \ v_j \ \ldots \ v_N]^T \quad (7)$$

$$l_p = \|v\|_p \quad (8)$$
$$= (|v_1|^p + |v_2|^p \ldots + |v_N|^p)^{\frac{1}{p}}$$
$$= \left( \sum_{j=1}^{N} |v_j|^p \right)^{\frac{1}{p}}$$

where p is a real number with $p \geq 1$, and the scalar element $v_j$ can be either real or complex number.

The squared $l_p$ norm may be defined as follows:

$$\text{Squared } l_p = sl_p = l_p^2 = \|v\|_p^2 \quad (9)$$

Exemplary Maximum-Likelihood Detection

The maximum likelihood (ML) detection is well-known technique in the art which utilizes maximum a posteriori (MAP) or equivalent Log-MAP algorithm to find the most likely transmitted modulation symbols. The ML detection achieves optimal accuracy because it evaluates all modulation symbols that can be potentially transmitted. The Log-MAP detector uses log likelihood ratios (LLRs) of coded bits to decide whether a bit "0" or a bit "1" is communicated over a wireless channel.

If $b_k$ is the $k^{th}$ bit of the transmitted symbol vector x, the bit LLR $L(b_k)$ can be represented as follows:

$$L(b_k) = LLR(b_k \mid y) \quad (10)$$

$$= \log\left[\frac{P(b_k=0\mid y)}{P(b_k=1\mid y)}\right]$$

$$= \log\left[\frac{\sum_{x:b_k=0} P(x\mid y)}{\sum_{x:b_k=1} P(x\mid y)}\right] = \log\left[\frac{\sum_{x:b_k=0} p(y\mid x)P(x)}{\sum_{x:b_k=1} p(y\mid x)P(x)}\right]$$

$$= \log\left[\frac{\sum_{x:b_k=0} p(y\mid x)}{\sum_{x:b_k=1} p(y\mid x)}\right]$$

where expression "$x:b_k=0$" denotes a set of candidate transmission bits x with the $k^{th}$ information bit equal to "0", expression "$x:b_k=1$" denotes a set of candidate transmission bits x with the $k^{th}$ information bit equal to "1", p(x) is a probability density function of candidate vector x, P(x) is a probability of x, and it is assumed that x is equally distributed.

The Gaussian probability density function may be associated with the transmission symbol vector x. In this case, expression (10) may be simplified as:

$$L(b_k) = LLR(b_k \mid y) \quad (11)$$

$$= \log\left[\frac{\sum_{x:b_k=0} p(y\mid x)}{\sum_{x:b_k=1} p(y\mid x)}\right]$$

$$= \log\left[\frac{\sum_{x:b_k=0} \exp(-d(x))}{\sum_{x:b_k=1} \exp(-d(x))}\right]$$

where metric d(x) may be defined as:

$$d(x) = d(x_1, \ldots x_j \ldots, x_{N_t}) \quad (12)$$

$$= \frac{\|y - Hx\|^2}{\sigma_n^2}$$

For $j^{th}$ spatial data stream, $x_j \in C^{M=2^B}$ where M is the number of constellation points and B is a modulation order (number of bits per modulation symbol). The operational complexity of this search algorithm is therefore proportional to $O(M^{N_t})$ and corresponds to the number of hypothesized transmission symbol vectors x in equation (11).

In order to reduce computational complexity of the Log-MAP approach, the Max-Log-MAP algorithm may be applied. If the Gaussian probability density function for the transmission symbol vector x is again assumed, the LLR for the $k^{th}$ bit of the transmission signal vector x $L(b_k)$ may be computed as:

$$L(b_k) = LLR(b_k \mid y) \quad (13)$$

$$= \log\left[\frac{\sum_{x:b_k=0} p(y\mid x)}{\sum_{x:b_k=1} p(y\mid x)}\right]$$

$$\approx \log\left[\frac{\max_{x:b_k=0} p(y\mid x)}{\max_{x:b_k=1} p(y\mid x)}\right]$$

$$= \log\left[\frac{\max_{x:b_k=0} \exp(-d(x))}{\max_{x:b_k=1} \exp(-d(x))}\right]$$

$$= \min_{x:b_k=1} d(x) - \min_{x:b_k=0} d(x)$$

The operational complexity of this approach is still proportional to $O(M^{N_t})$, but, as shown in expression (13), the search operations may now be used instead of summation operations of the Log-MAP approach given by equation (11).

As shown by equation (12), calculation of LLRs in both algorithms may be based on $l_2^2$ norms. Assuming unitary variance of effective noise at the receiver (after pre-whitening, for example), the $c^{th}$ metric $d_c$ from equation (12) and (13) may be represented as:

$$d_c = l_2^2 = \|v\|_2^2 \quad (14)$$

where, v=y−Hx, c=1, 2, ..., $M^{N_t}$

Figure 5:
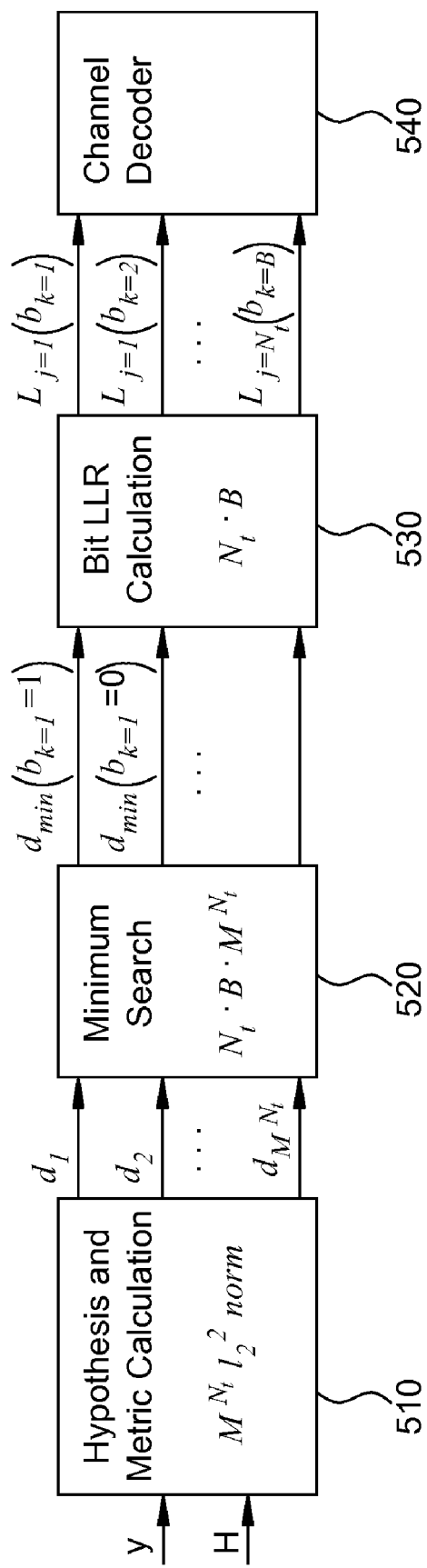
FIG. 5 shows a block diagram of a typical implementation of Max-Log-MAP ML detection in accordance with certain embodiments of the present disclosure.

FIG. 5 shows a block diagram of a typical implementation of the Max-Log-MAP ML detection. Channel estimates of spatial sub-channels for one frequency sub-band in the form of matrix H and vector of received samples y can be input into unit 510. All possible $M^{N_T}$ vector symbols x that can be transmitted from $N_T$ antennas may be hypothesized and $M^{N_T}$ $l_2^2$ norms may be calculated as specified by equation (14). Following this, unit 520 may perform search for minima metrics for every transmission bit k=1, 2, ..., $N_T$·B for all hypotheses x for which transmission bit k is equal to bit "0", and for all hypotheses x for which transmission bit k is equal to bit "1". Therefore, computational complexity of this search process is again proportional to $O(N_T \cdot B \cdot M^{N_T})$.

Based on found minima metrics for every transmission bit k=1, 2, ..., $N_T$·B, bit LLRs may be calculated in unit 530 as shown in equation (13). Calculated LLRs for all $N_T$·B coded bits transmitted over a plurality of spatial sub-channels on one frequency bin may then be passed to the outer channel decoder 540 that provides decoded spatial data streams at its output.

Exemplary Maximum-Likelihood Detection Based on QR Decomposition

The Max-Log-MAP maximum-likelihood detection may be also implemented with the pre-processing based on QR decomposition (hereinafter abbreviated as QRML detection). By applying the pre-processing with QR decomposition, the computational complexity of Max-Log-MAP based ML detection can be reduced, while preserving detection accuracy.

In the QRML detection, instead of all $N_T$ spatial data streams, ($N_T$−1) streams may be hypothesized. A remaining spatial data stream can be deterministic, and may be generated by rotating received symbols with a unitary matrix obtained after QR decomposition of the channel matrix. Filtered symbols may then be sliced to obtain estimated modulation symbols for that particular spatial data stream. A process of hypothesizing ($N_T$−1) spatial data streams and filtering a remaining stream may be performed for every spatial data stream. Because not all possible spatial streams are hypothesized, computational complexity of the candidate search process may be reduced compare to conventional maximum-likelihood detection.

Figure 6:
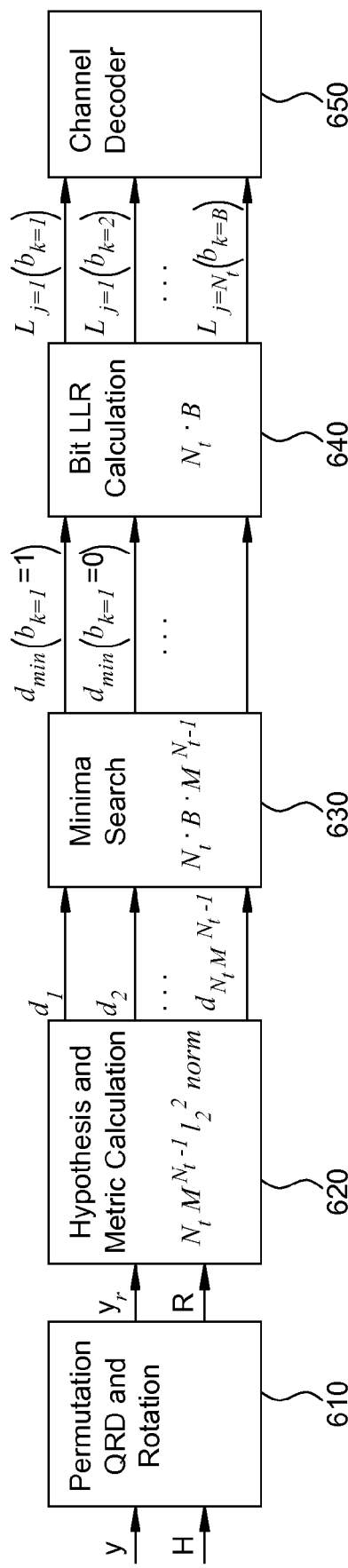
FIG. 6 shows a block diagram of Max-Log-MAP QRML detector in accordance with certain embodiments of the present disclosure.

FIG. 6 shows a block diagram of the Max-Log-MAP QRML detector. The channel matrix H may be permuted in unit 610 for every spatial data streams $j=1, 2, \ldots, N_T$ such that the rightmost column of the permuted matrix $H_P$ corresponds to the $j^{th}$ decoded spatial data stream:

$$H_P = [h_{p(1)} h_{p(2)} \ldots h_{p(N_T-1)} h_{p(N_T)=j}] \quad (15)$$

The QR decomposition of the permuted channel matrix for the $j^{th}$ spatial data stream may be represented as:

$$H_P = QR \quad (16)$$

The QR decomposition operation may be performed for every spatial data stream in the system by utilizing the appropriate permuted channel matrix.

The rotation (or, equivalently, the zero-forcing filtering) of the received symbol vector for every spatial data stream may also be performed in unit 610 by utilizing the appropriate unitary matrix Q from the QR decomposition operation given by equation (16):

$$y_r = Q^H \cdot y \quad (17)$$

For every spatial data stream $j=1, 2, \ldots, N_T$, the rotated received symbol vector $y_r$ may be sliced by unit 620 to obtain estimated modulation symbols for that particular spatial data stream j. All other ($N_T-1$) spatial streams may be hypothesized with all possible transmission symbols. Therefore, unit 620 may calculate $N_T \cdot M^{N_T-1}$ metrics based on $l_2^2$ norms as:

$$d_c = l_2^2 = \|v\|_2^2 \quad (18)$$

where, $v = y_r - Rx$, $c=1, 2, \ldots, N_T M^{N_T-1}$
where $y_r$ is a rotated received vector from equation (17), and matrix R represents an upper triangular matrix obtained from equation (16) after QR decomposition of the appropriately permuted channel matrix given by equation (15) for the particular spatial data stream j.

Unit 630 performs search for minima metrics for every transmission bit $k=1, 2, \ldots, N_T \cdot B$ assuming all hypotheses x for which bit k is equal to bit "0", and all hypotheses x for which bit k is equal to bit "1". Computational complexity of the candidate search process is therefore proportional to $O(N_T \cdot B \cdot N_T \cdot M^{N_T-1})$ since there are $N_T \cdot M^{N_T-1}$ hypotheses to be compared for every coded bit.

Based on found minima metrics for every bit $k=1, 2, \ldots, N_T \cdot B$ that may be transmitted on a single frequency bin, LLRs can be calculated in unit 640 by subtracting minima metrics:

$$L(b_k) = LLR(b_k | y) \quad (19)$$
$$= \log\left[\frac{\sum_{x:b_k=0} \exp(-d(x))}{\sum_{x:b_k=1} \exp(-d(x))}\right]$$
$$\approx \log\left[\frac{\max_{x:b_k=0} \exp(-d(x))}{\max_{x:b_k=1} \exp(-d(x))}\right]$$
$$= \min_{x:b_k=1} d(x) - \min_{x:b_k=0} d(x)$$

where $$d(x) = d(x_1, \ldots x_j \ldots, x_{N_t}) \quad (20)$$
$$= \frac{\|y_r - Rx\|^2}{\sigma_n^2}$$

It can be observed from equation (20) that a metric for LLR calculation is still $l_2^2$ norm. Assuming unitary variance of effective noise at the receiver (for example, after pre-whitening), the $c^{th}$ metric $d_c$ from metric calculation unit 620 can be obtained as:

$$d_c = l_2^2 = \|v\|_2^2 \quad (21)$$

where, $v = y_r - Rx$, $c=1, 2, \ldots, N_T M^{N_T-1}$

Computed LLRs for all $N_T \cdot B$ coded bits transmitted over a plurality of spatial sub-channels using a single frequency bin may be then passed to the outer channel decoder 650 that provides decoded spatial data streams at the output.

The QRML detection is an optimal solution referencing Max-Log-MAP algorithm, and thus provides identical error-rate performance as the Max-Log-MAP based ML detection. This may be confirmed by simulation results, which are also provided in the present disclosure. Computational complexity of the candidate search process is reduced.

Exemplary Maximum-Likelihood Detection with Post-Squaring Composition

The Max-Log-MAP ML detection with post-squaring compensation of norms (PC-ML detection) may be proposed to reduce computational complexity of the Max-Log-MAP ML algorithm while preserving the error-rate performance. In the PC-ML detection, the transmission signal may be hypothesized based on un-squared $l_2$ norms instead of squared $l_2$ norms, and then searching for minima un-squared distances may be performed. Squaring of metrics may be postponed until minima un-squared norms are determined. By computing un-squared norms and by post-squaring only a limited number of calculated metrics, computational complexity may be significantly reduced, while identical detection accuracy can be achieved as for previously presented ML and QRML solutions.

Figure 7:
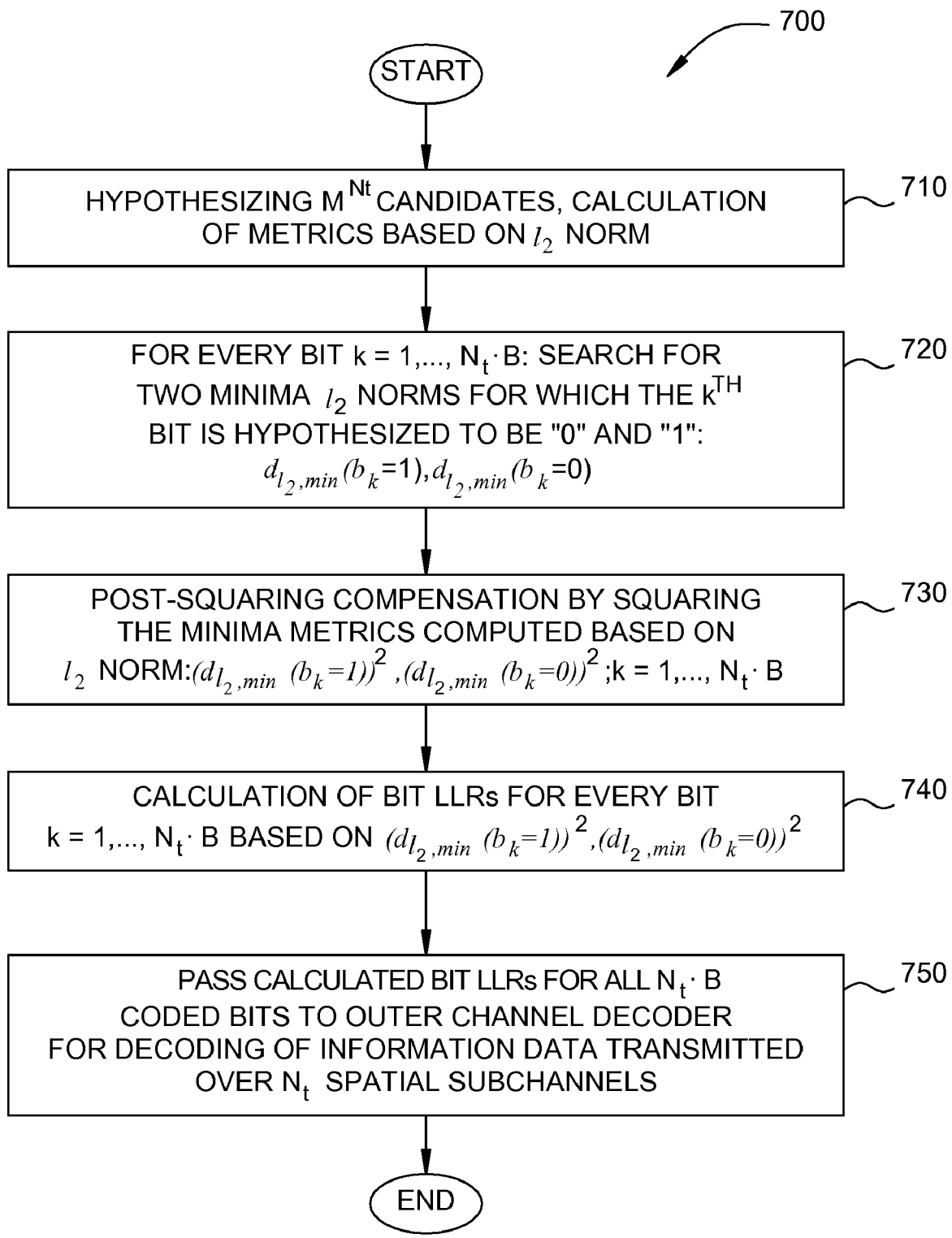
FIG. 7 shows a process of Max-Log-MAP ML detection with post-squaring compensation in accordance with certain embodiments of the present disclosure.
Figure 8:
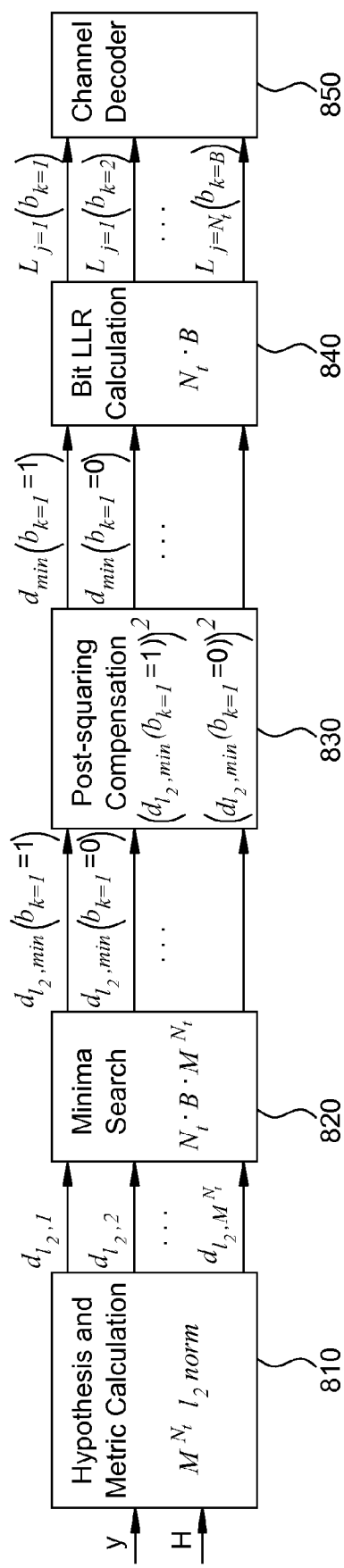
FIG. 8 shows a block diagram of Max-Log-MAP ML detector with post-squaring compensation in accordance with certain embodiments of the present disclosure.

FIG. 7 shows a process of Max-Log-MAP ML detection with post-squaring compensation, and FIG. 8 illustrates an example block diagram of Max-Log-MAP ML detector with post-squaring compensation that performs processing flow from FIG. 7. Initially, $M^{N_T}$ transmission symbol candidates may be hypothesized based on the received signal vector and channel estimates, at 710. Metrics may be calculated based on un-squared $l_2$ norms instead of $l_2^2$ norms, as it is also illustrated with unit 810 in FIG. 8. At 720, for every transmission bit $k=1, 2, \ldots, N_T \cdot B$, unit 820 performs search for minima metrics for all hypotheses x for which bit k is equal to bit "0", and for all hypotheses x for which bit k is equal to bit "1". The computational complexity of the search process is therefore proportional to $O(N_T \cdot B \cdot M^{N_T})$.

Once the minima metrics for all coded bits are determined, unit 830 in FIG. 8 may perform the post-squaring compensation of the minima metrics, at 730. The post-squared minima metrics of the PC-ML detection produces identical results as minima metrics of the original ML detection, i.e. $l_2^2$ norms are equivalent to the post-squared $l_2$ norms.

From equation (14), the relationship between $l_2^2$ norm and $l_2$ norm may be obtained as follows:

$$d_c = l_2^2 = \|v\|_2^2 \quad (22)$$

$$= \left(\sqrt{\sum_{j=1}^{N_t} |v_j|^2}\right)^2$$

$$= (d_{l_2,c})^2 = (l_2)^2$$

where, $v = y - Hx$, $c = 1, 2, \ldots, M^{N_t}$

The post squaring of minima metric may be applied to recover squared $l_2$ norms required for bit LLR calculation. Let $d_{l_2,min}$ be the arbitrary minimum $l_2$ norm as a result of minima search:

$$d_{l_2,min} = \min(d_{l_2,c}) \quad (23)$$

The post-squaring of the smallest $l_2$ norm results into equivalent minimum $l_2^2$ norm:

$$d_{min} = (d_{l_2,min})^2 \quad (24)$$

$$= \left(\min_x(\|v\|_2)\right)^2$$

$$= \left(\min_x\left(\sqrt{\sum_{j=1}^{N_t}|v_j|^2}\right)\right)^2$$

$$= \min_x\left(\left(\sqrt{\sum_{j=1}^{N_t}|v_j|^2}\right)^2\right)$$

$$= \min_x(\|v\|_2^2)$$

Therefore, if there is no approximation for calculating $l_2$ norms, then the result of minima search algorithm using $l_2$ norms may be equivalent to the result of minima search using $l_2^2$ norms.

At 740, for every bit $k=1, 2, \ldots, N_T \cdot B$ transmitted on a single frequency bin, bit LLR $L(b_k)$ may be calculated by unit 840 based on squared minima metrics from equation (22) as:

$$L(b_k) = \log\left[\frac{\max_{x:b_k=0}\exp(-d(x))}{\max_{x:b_k=1}\exp(-d(x))}\right] \quad (25)$$

$$= \min_{x:b_k=1} d(x) - \min_{x:b_k=0} d(x)$$

$$= \log\left[\frac{\max_{x:b_k=0}\exp(-(d_{l_2}(x))^2)}{\max_{x:b_k=1}\exp(-(d_{l_2}(x))^2)}\right]$$

$$= \left(\min_{x:b_k=1} d_{l_2}(x)\right)^2 - \left(\min_{x:b_k=0} d_{l_2}(x)\right)^2$$

It can be observed from equation (25) that un-squared $l_2$ norms may be computed during the metric calculation stage of the PC-ML detection algorithm. If the variance of effective noise at the receiver is unitary (after pre-whitening, for example), the $c^{th}$ metric $d_{l_2,c}$ from metric calculation block may be computed as:

$$d_{l_2,c} = l_2 = \|v\|_2 \quad (26)$$

where, $v = y - Hx$, $c = 1, 2, \ldots, M^{N_t}$

It can be observed from equation (25) that the Max-Log-MAP ML detection with post-squaring compensation may utilize only two squared $l_2$ norms per coded transmission bit representing minimum metric for bit "1" hypothesis and minimum metric for bit "0" hypothesis, instead of $M^{N_t}$ squared $l_2$ norms. Therefore, complexity overhead due to square operations can be small, and it may not affect the overall computational complexity. At 750, calculated LLRs for all $N_T \cdot B$ coded bits transmitted over a plurality of spatial sub-channels for a single frequency bin may be passed to the outer channel decoder 850 that provides decoded data at its output.

Figure 9:
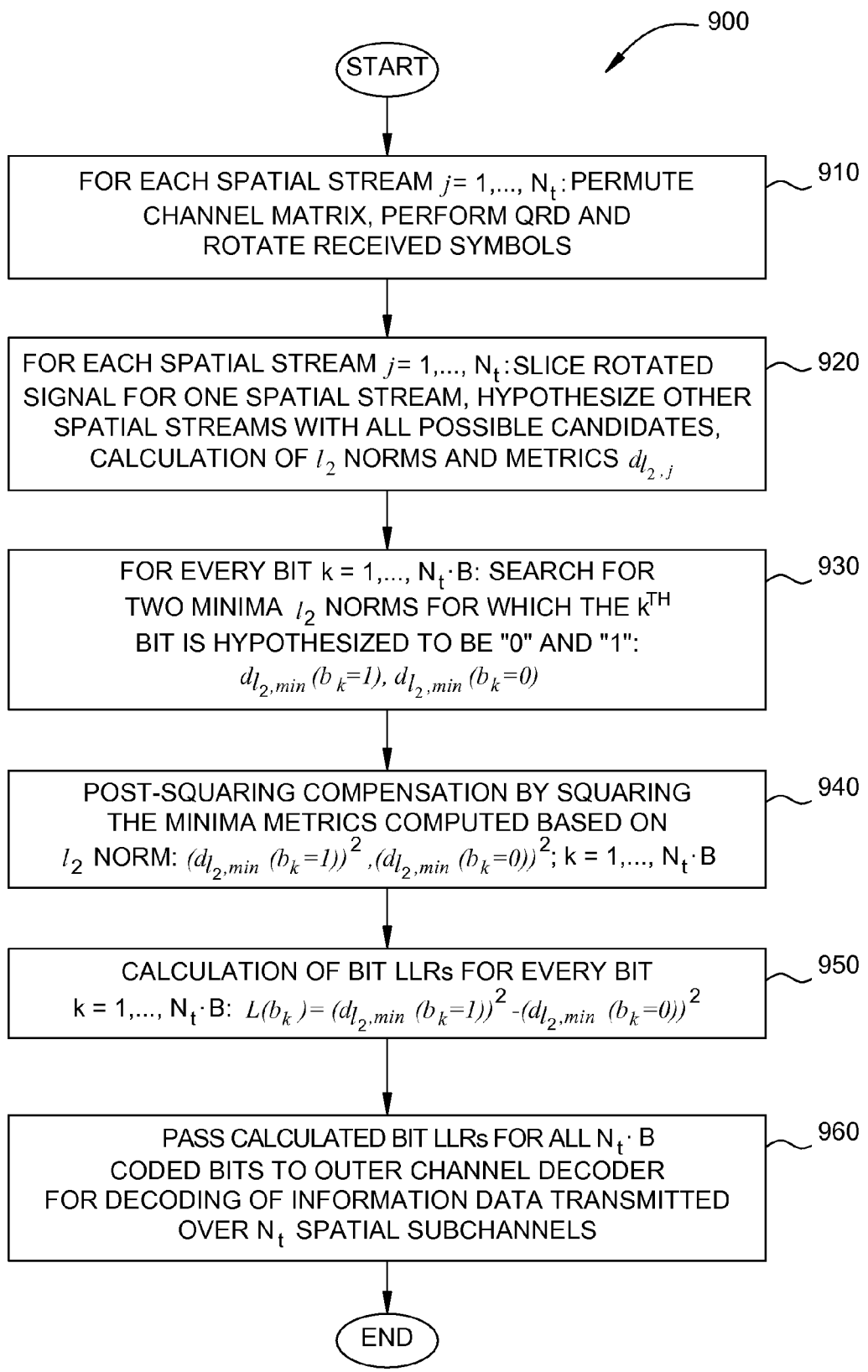
FIG. 9 shows a process of Max-Log-MAP QRML detection with post-squaring compensation in accordance with certain embodiments of the present disclosure.

The post-squaring compensation may be also applied for the ML detection with QR preprocessing (hereinafter abbreviated as PC-QRML detection). FIG. 9 shows a process of Max-Log-MAP QRML detection with post-squaring compensation, and FIG. 10 shows a block diagram of Max-Log-MAP ML detector with post-squaring compensation that performs processing flow from FIG. 9.

At 910, for every spatial data stream $j=1, 2, \ldots, N_T$, the channel matrix may be permuted by unit 1010 such that the rightmost column of the permuted matrix corresponds to the $j^{th}$ decoded stream as shown in equation (15). The QR decomposition of permuted channel matrix for every utilized spatial data stream is then performed, and the received symbol vector may be rotated as defined by equation (17).

At 920, for every spatial data stream $j=1, 2, \ldots, N_T$, rotated received symbols may be sliced in unit 1020 in order to obtain estimated modulation symbols for that particular spatial data stream $j$. All other $(N_T-1)$ spatial data streams may be hypothesized with all possible transmission symbols. Therefore, unit 1020 calculates $N_T \cdot M^{N_T-1}$ metrics based on $l_2$ norms. At 930, for every transmission bit $k=1, 2, \ldots, N_T \cdot B$, unit 1030 performs search for minima metrics for all hypotheses x for which bit k is equal to bit "0", and for all hypotheses x for which bit k is equal to bit "1". Computational complexity of the candidate search process is therefore proportional to $O(N_T \cdot B \cdot N_T \cdot M^{N_T-1})$.

Figure 10:
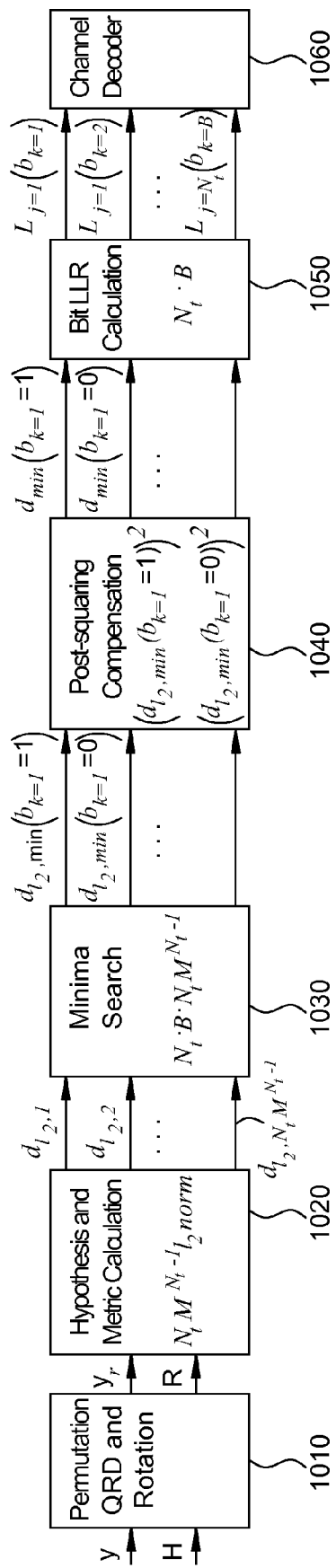
FIG. 10 shows a block diagram of Max-Log-MAP QRML detector with post-squaring compensation in accordance with certain embodiments of the present disclosure.

At 940, once the minima metrics for all coded bits are determined, unit 1040 in FIG. 10 may perform the post-squaring compensation of minima metrics. As shown before, the post-squaring of minima metrics in the PC-QRML detection algorithm produces identical results as minima metrics of the original ML detection, i.e. $l_2^2$ norms are equivalent to post-squared $l_2$ norms. At 950, for every coded transmission bit $k=1, 2, \ldots, N_T \cdot B$, bit LLR $L(b_k)$ may be calculated based on squared minima metrics in unit 1050 as follows:

$$L(b_k) = \log\left[\frac{\max_{x:b_k=0}\exp(-d(x))}{\max_{x:b_k=1}\exp(-d(x))}\right] \quad (27)$$

$$= \min_{x:b_k=1} d(x) - \min_{x:b_k=0} d(x)$$

$$= \log\left[\frac{\max_{x:b_k=0}\exp(-(d_{l_2}(x))^2)}{\max_{x:b_k=1}\exp(-(d_{l_2}(x))^2)}\right]$$

$$= \left(\min_{x:b_k=1} d_{l_2}(x)\right)^2 - \left(\min_{x:b_k=0} d_{l_2}(x)\right)^2$$

Assuming unitary variance of the effective noise at the receiver (after pre-whitening, for example), the $c^{th}$ metric $d_{l_2,c}$ from the metric calculation block 1020 may be determined as:

$$d_{l_2,c} = l_2 = \|v\|_2 \quad (28)$$

where, $v = y_r - Rx$, $c = 1, 2, \ldots, N_t M^{N_T-1}$

At 960, calculated LLRs for all $N_T \cdot B$ coded bits transmitted over a plurality of spatial sub-channels for a single frequency bin may be passed to the outer channel decoder 1060 that provides decoded bits at its output.

The calculation of un-squared $l_2$ norm may require smaller dynamic range than the calculation of $l_2^2$ norm caused by range compression of the square-root operations from equation (8). Therefore, a smaller arithmetic precision for representation of $l_2$ norms may be required than for representation of $l_2^2$ norms. This leads to smaller memory requirements for PC-ML and PC-QRML detection algorithms.

Another advantage of the post-squaring compensation may be a reduction in complexity for calculation of metrics. While it may appear that the ML detection with the post-squaring compensation may require more computations than the original approach based on $l_2^2$ norm due to square-root operations from equation (8). But, this holds only if the exact un-squared $l_2$ norm is calculated. However, computational complexity of the PC-QRML detection may be significantly reduced if the calculation of $l_2$ norm is approximated.

There are two aspects for approximate calculation of un-squared $l_2$ norms that may need to be considered: computational complexity and accuracy. By applying the "maxsum" approximation, according to the equation below, computation of $l_2$ norms may be accurately obtained with the summation and comparison operations instead of square-root operations:

$$d_{l_2,c} = \|v\|_2 = \sqrt{\sum_{j=1}^{N_t} |v_j|^2} \quad (29)$$

$$\approx \max(|z_j|) + F \cdot \left( \sum_{j, j \neq m} |z_j| \right)$$

$$= \max(|z_j|) + F \cdot \left( \left( \sum_j |z_j| \right) - \max(|z_j|) \right)$$

where $$z = [real(v_1), imag(v_1), real(v_2), imag(v_2), \ldots, real(v_{N_t}), imag(v_{N_t})]^T$$

$$= [z_1, z_2, \ldots, z_{2N_t}]^T$$

$$m = \underset{j}{\operatorname{argmax}}(|z_j|)$$

Parameter F is a tuning factor that may be determined by simulations.

FIG. 11 shows comparison of computational complexity between several ML detection schemes. The number of utilized arithmetic operations in different algorithms is compared. In this exemplary case, the bit-precision for representation of LLRs and memory requirements are not considered as factors for comparison of computational complexity. As an illustrative example, it may be assumed a wireless system with two transmit and two receive antennas, 64-QAM modulation may be applied at the transmitter, the Max-Log-MAP ML detection and QRML detection may utilize squared $l_2$ norms for computation of metric. The PC-ML detection and the PC-QRML detection may utilize "maxsum" approximation for calculation of un-squared $l_2$ norms given by equation (29) with the tuning factor F=0.25.

The number of arithmetic operations provided in FIG. 11 corresponds to the detection of two spatial data streams for a single frequency sub-band with 12 coded transmission bits that represent two 64-QAM modulation symbols. It can be observed that ML and QRML algorithms use large number of real multiplications to calculate metrics. On the other side, in the PC-ML and PC-QRML algorithms, real multiplications may be replaced by comparison and select operations. Also, computational complexity of minima search may be reduced.

The post-squaring compensation assumes only small number of multiplications: two real multiplications per coded transmission bit. Therefore, total computational complexity of detection algorithms with post-squaring compensation may be substantially smaller.

Simulations have been conducted in order to evaluate error rate performance of different detection algorithms. All analyzed schemes utilize exact calculation of norms and floating point representation of numbers. A wireless system with two transmit and two receive antennas may be assumed with Vertical encoding and with 64-QAM modulation type may be applied at the transmitter. Two different coding schemes may be utilized in simulations: tailbiting convolutional codes (TBCC) with rates ½, ⅔ and ¾, and convolution Turbo codes (CTC) with rates ½, ⅔, ¾ and ⅚. The number of data packets used in simulations is equal to 10000, it is assumed perfect channel state information at the receiver. The fading scenario is Vehicular-A channel with the speed of mobile subscriber of 30 km/h, which corresponds to the Doppler frequency of 64 Hz. The carrier frequency of 2.3 GHz may be utilized.

FIG. 12 summarizes features of ML detection schemes that are evaluated by aforementioned simulations. It can be observed that $l_2$ and squared $l_2$ norms may be exploited for metric calculation in different detection algorithms. The reference algorithm in terms of error-rate performance is the QRML detection with metric based on squared $l_2$ norms because of optimal error rate performance.

FIG. 13 illustrates loss in dB units of QRML detection with metric based on non-squared $l_2$ norms and of PC-QRML detection, relative to the QRML detection with metric based on direct computation of squared $l_2$ norms at the packet error rate (PER) of $10^{-2}$. It can be observed that the PC-QRML detection algorithm shows identical PER performance as the QRML detection with metric based on direct computation of squared $l_2$ norms. Also, the QRML detection with non-squared norms (post-squaring is not applied) may experience error-rate performance degradation especially in the case of CTC codes.

Figure 7A:
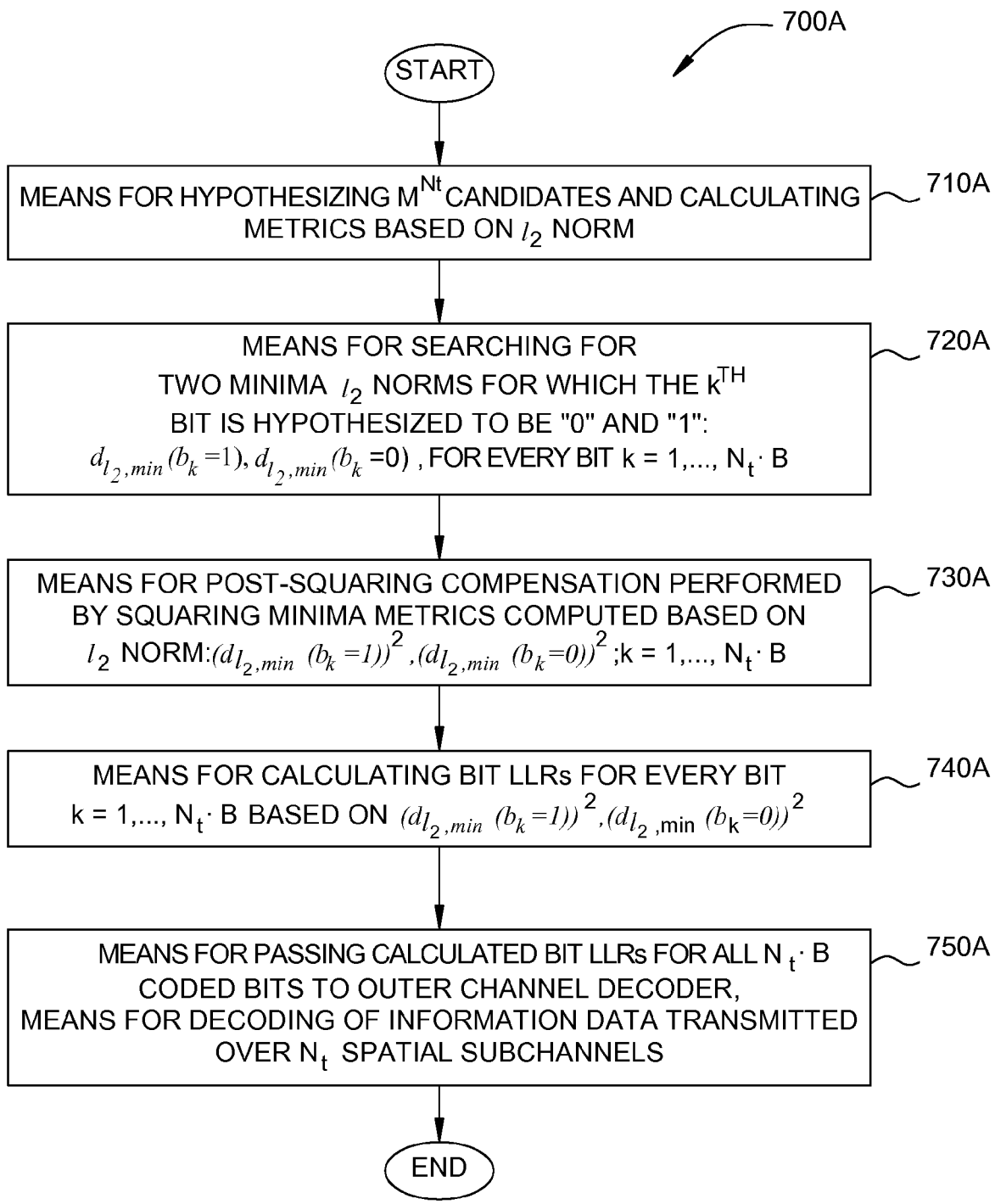
FIG. 7A illustrates example components capable of performing the operations illustrated in FIG. 7.
Figure 9A:
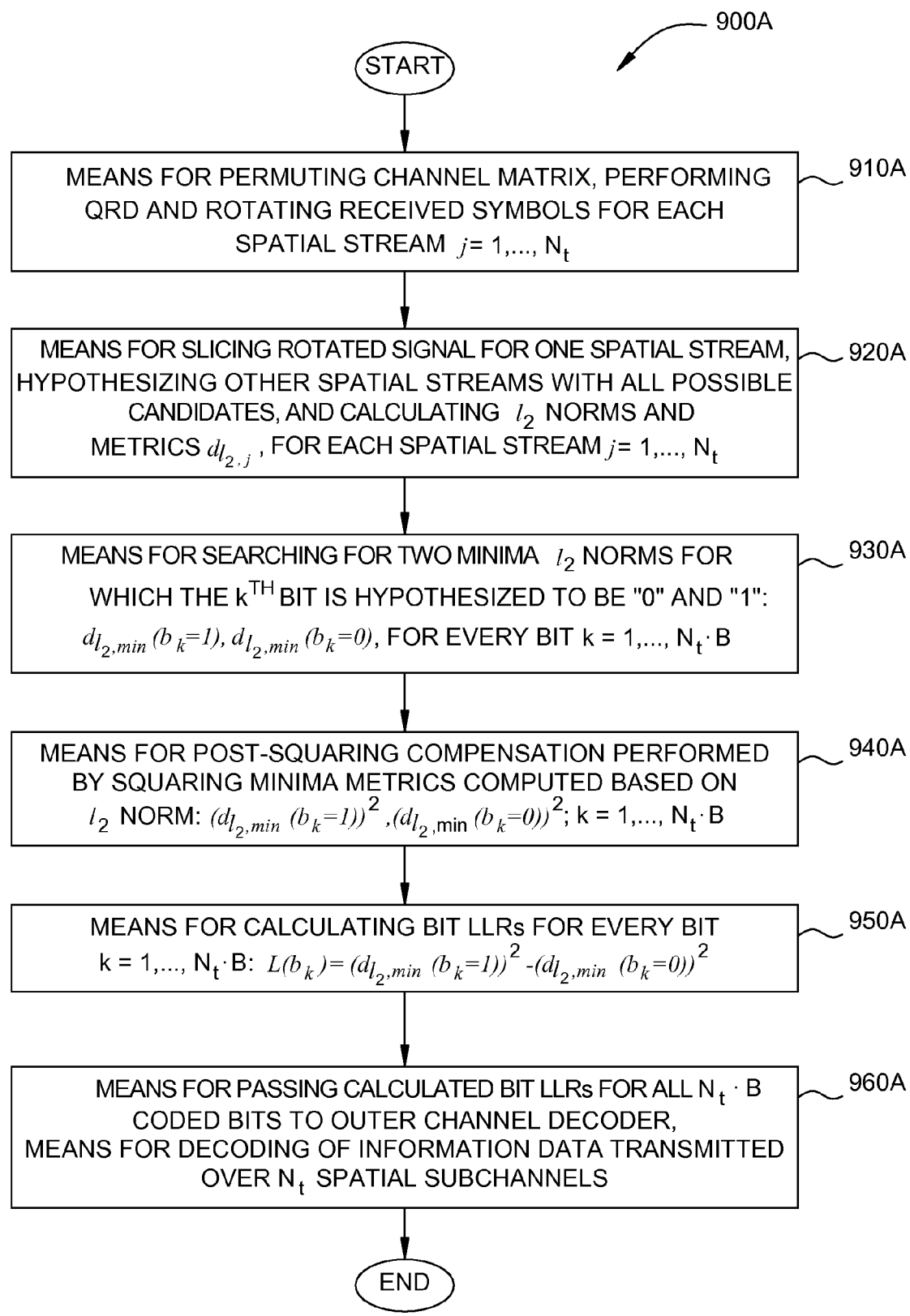
FIG. 9A illustrates example components capable of performing the operations illustrated in FIG. 9.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 710-750 illustrated in FIG. 7 correspond to means-plus-function blocks 710A-750A illustrated in FIG. 7A. Similarly, blocks 910-960 illustrated in FIG. 9 correspond to means-plus-function blocks 910A-960A illustrated in FIG. 9A.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for detection of data transmitted on a plurality of spatial channels in a multiple-input multiple-output wireless communications system, comprising:

computing approximate $l_2$ norm values using a maxsum approximation technique;

calculating un-squared $l_2$ norm metrics utilizing the approximated $l_2$ norm values for a set of hypothesized symbols that correspond to coded bits transmitted over the spatial channels;

searching the un-squared $l_2$ norm metrics for minima metrics of the un-squared $l_2$ norm metrics;

squaring the minima metrics of the un-squared $l_2$ norm metrics found during the searching to obtain post-squared metrics;

calculating log-likelihood ratio values for coded bits transmitted over the spatial channels using post-squared metrics; and outputting bits decoded from the coded bits transmitted over the spatial channels.

2. The method of claim 1, comprising:
decoding bits transmitted over the plurality of spatial subchannels by using the calculated log-likelihood ratios.

3. The method of claim 1, further comprising:
permuting a matrix of channel estimates for the spatial channels, to generate permuted matrices of channel estimates for the plurality of spatial streams; and
performing QR decomposition of the permuted matrices to generate a unitary matrix and an upper triangular matrix for the plurality of spatial streams.

4. The method of claim 3, further comprising:
rotating a received signal with the unitary matrices to generate filtered outputs;
slicing filtered outputs to obtain sliced coded bits for the plurality of spatial streams;
hypothesizing symbols that may be transmitted on the spatial streams using sliced coded bits; and
decoding bits transmitted over the plurality of spatial subchannels by using calculated log-likelihood ratios of coded bits.

5. An apparatus for detection of data transmitted on a plurality of spatial channels in a multiple-input multiple-output wireless communications system, comprising:
a processor;
a memory in electronic communication with the processor, wherein the memory stores executable instructions that when executed by the processor cause the processor to perform operations comprising:
computing approximate $l_2$ norm values using a maxsum approximation technique;
calculating un-squared $l_2$ norm metrics utilizing the approximate $l_2$ norm values for a set of hypothesized symbols that correspond to coded bits transmitted over the spatial channels;
searching the un-squared $l_2$ norm metrics for minima metrics of the un-squared $l_2$ norm metrics;
squaring the minima metrics of the un-squared $l_2$ norm metrics found during the searching to obtain post-squared metrics;
calculating log-likelihood ratio values for coded bits transmitted over the spatial channels using post-squared metrics; and
outputting bits decoded from the coded bits transmitted over the spatial channels.

6. The apparatus of claim 5, wherein the processor is further configured to perform:
    decoding bits transmitted over the plurality of spatial sub-channels by using the calculated log-likelihood ratios.

7. The apparatus of claim 5, wherein the processor is further configured to perform:
    permuting a matrix of channel estimates for the spatial channels, to generate permuted matrices of channel estimates for the plurality of spatial streams; and
    performing QR decomposition of the permuted matrices to generate a unitary matrix and an upper triangular matrix for the plurality of spatial streams.

8. The apparatus of claim 7, wherein the processor is further configured to perform:
    rotating a received signal with the unitary matrices to generate filtered outputs;
    slicing filtered outputs to obtain sliced coded bits for the plurality of spatial streams;
    hypothesizing symbols that may be transmitted on the spatial streams using sliced coded bits; and
    decoding bits transmitted over the plurality of spatial sub-channels by using calculated log-likelihood ratios of coded bits.

9. An apparatus for detection of data transmitted on a plurality of spatial channels in a multiple-input multiple-output wireless communications system, comprising:
    non-transitory means for computing approximate $l_2$ norm values using a maxsum approximation technique;
    non-transitory means for calculating un-squared $l_2$ norm metrics utilizing the approximated $l_2$ norm values for a set of hypothesized symbols that correspond to coded bits transmitted over the spatial channels;
    non-transitory means for searching the un-squared $l_2$ norm metrics for minima metrics of the un-squared $l_2$ norm metrics;
    non-transitory means for squaring the minima metrics of the un-squared $l_2$ norm metrics found during the searching to obtain post-squared metrics;
    non-transitory means for calculating log-likelihood ratio values for coded bits transmitted over the spatial channels using post-squared metrics; and
    non-transitory means for outputting bits decoded from the coded bits transmitted over the spatial channels.

10. The apparatus of claim 9, comprising:
    non-transitory means for decoding bits transmitted over the plurality of spatial sub-channels by using the calculated log-likelihood ratios.

11. The apparatus of claim 9, further comprising:
    non-transitory means for permuting a matrix of channel estimates for the spatial channels, to generate permuted matrices of channel estimates for the plurality of spatial streams; and
    non-transitory means for performing QR decomposition of the permuted matrices to generate a unitary matrix and an upper triangular matrix for the plurality of spatial streams.

12. The apparatus of claim 11, further comprising:
    non-transitory means for rotating a received signal with the unitary matrices to generate filtered outputs;
    non-transitory means for slicing filtered outputs to obtain sliced coded bits for the plurality of spatial streams;
    non-transitory means for hypothesizing symbols that may be transmitted on the spatial streams using sliced coded bits; and
    non-transitory means for decoding bits transmitted over the plurality of spatial sub-channels by using calculated log-likelihood ratios of coded bits.

13. A computer-program product for detection of data transmitted on a plurality of spatial channels in a multiple-input multiple-output wireless communications system, comprising a non-transitory computer readable medium having instructions stored thereon, the instructions being executable by one or more processors and the instructions comprising:
    instructions for computing approximate $l_2$ norm values using a maxsum approximation technique;
    instructions for calculating un-squared $l_2$ norm metrics utilizing the approximated $l_2$ norm values for a set of hypothesized symbols that correspond to coded bits transmitted over the spatial channels;
    instructions for searching the un-squared $l_2$ norm metrics for minima metrics of the un-squared $l_2$ norm metrics;
    instructions for squaring the minima metrics of the un-squared $l_2$ norm metrics found during the searching to obtain post-squared metrics;
    instructions for calculating log-likelihood ratio values for coded bits transmitted over the spatial channels using post-squared metrics; and
    instructions for outputting bits decoded from the coded bits transmitted over the spatial channels.

14. The computer-program product of claim 13, wherein the instructions further comprise:
    instructions for decoding bits transmitted over the plurality of spatial sub-channels by using the calculated log-likelihood ratios.

15. The computer-program product of claim 13, wherein the instructions further comprise:
    instructions for permuting a matrix of channel estimates for the spatial channels, to generate permuted matrices of channel estimates for the plurality of spatial streams; and
    instructions for performing QR decomposition of the permuted matrices to generate a unitary matrix and an upper triangular matrix for the plurality of spatial streams.

16. The computer-program product of claim 15, wherein the instructions further comprise:
    instructions for rotating a received signal with the unitary matrices to generate filtered outputs;
    instructions for slicing filtered outputs to obtain sliced coded bits for the plurality of spatial streams;
    instructions for hypothesizing symbols that may be transmitted on the spatial streams using sliced coded bits; and
    instructions for decoding bits transmitted over the plurality of spatial sub-channels by using calculated log-likelihood ratios of coded bits.

* * * * *